United States Patent
Johnsen et al.

(10) Patent No.: US 9,262,155 B2
(45) Date of Patent: Feb. 16, 2016

(54) SYSTEM AND METHOD FOR SUPPORTING IN-BAND/SIDE-BAND FIRMWARE UPGRADE OF INPUT/OUTPUT (I/O) DEVICES IN A MIDDLEWARE MACHINE ENVIRONMENT

(71) Applicant: Oracle International Corporation, Redwood Shores, CA (US)

(72) Inventors: Bjørn Dag Johnsen, Oslo (NO); Martin Paul Mayhead, Hindhead (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/098,075

(22) Filed: Dec. 5, 2013

(65) Prior Publication Data
US 2015/0160937 A1 Jun. 11, 2015

(51) Int. Cl.
G06F 9/445 (2006.01)
(52) U.S. Cl.
CPC ..................................... G06F 8/665 (2013.01)
(58) Field of Classification Search
None
See application file for complete search history.

(56) References Cited

U.S. PATENT DOCUMENTS

| | | | |
|---|---|---|---|
| 5,805,805 A | 9/1998 | Civanlar et al. | |
| 6,748,429 B1 | 6/2004 | Talluri et al. | |
| 6,941,350 B1 | 9/2005 | Frazier et al. | |
| 6,963,932 B2 | 11/2005 | Bhat | |
| 6,978,300 B1 | 12/2005 | Beukema et al. | |
| 6,981,025 B1 | 12/2005 | Frazier et al. | |
| 6,985,956 B2 | 1/2006 | Luke et al. | |
| 7,069,468 B1 | 6/2006 | Olson | |
| 7,113,995 B1 | 9/2006 | Beukema et al. | |
| 7,185,025 B2 | 2/2007 | Rosenstock et al. | |
| 7,200,704 B2 | 4/2007 | Njoku et al. | |
| 7,216,163 B2 | 5/2007 | Sinn | |
| 7,221,676 B2 | 5/2007 | Green | |
| 7,231,518 B1 | 6/2007 | Bakke | |
| 7,290,277 B1 | 10/2007 | Chou et al. | |
| 7,318,151 B1 * | 1/2008 | Harris | 713/2 |

(Continued)

FOREIGN PATENT DOCUMENTS

| EP | 2 051 436 A1 | 4/2009 |
|---|---|---|
| EP | 2160068 A1 | 3/2010 |

(Continued)

OTHER PUBLICATIONS

"Introduction to InfiniBand." Mellanox. Mellanox Technologies Inc, Feb. 1, 2002. Web. Dec. 17, 2014. <http://www.mellanox.com/pdf/whitepapers/IB_Intro_WP_190.pdf>.*

(Continued)

*Primary Examiner* — Wei Zhen
*Assistant Examiner* — Binh Luu
(74) *Attorney, Agent, or Firm* — Tucker Ellis LLP

(57) ABSTRACT

A system and method can support controlled and secure firmware upgrade in a middleware machine environment. The system can provide an input/output (I/O) device, which is associated with a host node. The host node can use the I/O device to connect to a shared resource, and the I/O device operates to receive at least one of a firmware image and a firmware update from a fabric administrator that manages the shared resource, and upgrade firmware in the I/O device. Furthermore, the system allows the fabric administrator to send said at least one of a firmware image and a firmware update to the I/O device, using either an in-band connection or a side-band connection.

17 Claims, 10 Drawing Sheets

(56) References Cited

U.S. PATENT DOCUMENTS

| | | | |
|---|---|---|---|
| 7,356,841 B2 | 4/2008 | Wilson et al. | |
| 7,398,394 B1* | 7/2008 | Johnsen et al. | 713/168 |
| 7,409,432 B1 | 8/2008 | Recio et al. | |
| 7,437,447 B2 | 10/2008 | Brey et al. | |
| 7,493,409 B2 | 2/2009 | Craddock et al. | |
| 7,500,236 B2 | 3/2009 | Janzen | |
| 7,633,955 B1 | 12/2009 | Saraiya et al. | |
| 7,634,608 B2 | 12/2009 | Droux et al. | |
| 7,685,385 B1 | 3/2010 | Choudhary et al. | |
| 7,724,748 B2 | 5/2010 | Davis | |
| 7,746,872 B2 | 6/2010 | Norden | |
| 7,860,961 B1 | 12/2010 | Finkelstein et al. | |
| 7,873,711 B2 | 1/2011 | Adams et al. | |
| 7,936,753 B1 | 5/2011 | Colloff et al. | |
| 7,975,147 B1 | 7/2011 | Qumei | |
| 8,175,107 B1 | 5/2012 | Yalagandula et al. | |
| 8,234,407 B2 | 7/2012 | Sugumar | |
| 8,291,148 B1 | 10/2012 | Shah et al. | |
| 8,327,437 B2 | 12/2012 | McAlister | |
| 8,331,381 B2 | 12/2012 | Brown et al. | |
| 8,484,353 B1 | 7/2013 | Johnson et al. | |
| 8,549,281 B2 | 10/2013 | Samovsky et al. | |
| 8,924,952 B1 | 12/2014 | Hou | |
| 8,972,966 B2 | 3/2015 | Kelso | |
| 2002/0059597 A1 | 5/2002 | Kikinis et al. | |
| 2002/0120720 A1 | 8/2002 | Moir | |
| 2003/0009487 A1 | 1/2003 | Prabakaran et al. | |
| 2003/0065775 A1 | 4/2003 | Aggarwal et al. | |
| 2003/0093509 A1 | 5/2003 | Li et al. | |
| 2003/0105903 A1 | 6/2003 | Garnett et al. | |
| 2003/0120852 A1 | 6/2003 | McConnell et al. | |
| 2004/0022245 A1 | 2/2004 | Forbes et al. | |
| 2004/0024903 A1 | 2/2004 | Costatino et al. | |
| 2004/0031052 A1 | 2/2004 | Wannamaker | |
| 2004/0123142 A1 | 6/2004 | Dubal et al. | |
| 2004/0162973 A1 | 8/2004 | Rothman | |
| 2004/0193768 A1 | 9/2004 | Carnevale | |
| 2004/0199764 A1 | 10/2004 | Koechling et al. | |
| 2004/0205253 A1 | 10/2004 | Arndt | |
| 2004/0249928 A1 | 12/2004 | Jacobs et al. | |
| 2004/0255286 A1 | 12/2004 | Rothman | |
| 2005/0018669 A1 | 1/2005 | Arndt et al. | |
| 2005/0071709 A1 | 3/2005 | Rosenstock et al. | |
| 2005/0091396 A1 | 4/2005 | Nilakantan et al. | |
| 2005/0105554 A1 | 5/2005 | Kagan et al. | |
| 2005/0182701 A1 | 8/2005 | Cheston | |
| 2005/0182853 A1 | 8/2005 | Lewites et al. | |
| 2005/0198250 A1 | 9/2005 | Wang | |
| 2005/0273641 A1 | 12/2005 | Sandven et al. | |
| 2006/0079278 A1 | 4/2006 | Ferguson et al. | |
| 2006/0136735 A1 | 6/2006 | Plotkin et al. | |
| 2006/0168339 A1 | 7/2006 | Shapiro et al. | |
| 2006/0195560 A1 | 8/2006 | Newport | |
| 2007/0016694 A1 | 1/2007 | Achler | |
| 2007/0050763 A1 | 3/2007 | Kagan | |
| 2007/0129917 A1 | 6/2007 | Blevins | |
| 2008/0031266 A1 | 2/2008 | Tallet et al. | |
| 2008/0183853 A1 | 7/2008 | Manion et al. | |
| 2008/0186853 A1 | 8/2008 | Archer et al. | |
| 2008/0186990 A1 | 8/2008 | Abali et al. | |
| 2008/0192750 A1 | 8/2008 | Ko et al. | |
| 2008/0219237 A1 | 9/2008 | Thubert | |
| 2008/0250125 A1 | 10/2008 | Brey et al. | |
| 2008/0285562 A1 | 11/2008 | Scott et al. | |
| 2008/0320117 A1* | 12/2008 | Johnsen et al. | 709/221 |
| 2009/0049164 A1 | 2/2009 | Mizuno | |
| 2009/0059913 A1 | 3/2009 | Duato | |
| 2009/0178033 A1 | 7/2009 | Challener | |
| 2009/0216853 A1 | 8/2009 | Burrow et al. | |
| 2009/0307499 A1 | 12/2009 | Senda | |
| 2009/0327462 A1 | 12/2009 | Adams et al. | |
| 2010/0008222 A1 | 1/2010 | Le Roux et al. | |
| 2010/0020806 A1 | 1/2010 | Vahdat | |
| 2010/0054117 A1 | 3/2010 | Southworth et al. | |
| 2010/0138532 A1 | 6/2010 | Glaeser et al. | |
| 2011/0072206 A1 | 3/2011 | Ross et al. | |
| 2011/0075673 A1 | 3/2011 | Hardie | |
| 2011/0090789 A1 | 4/2011 | Fung | |
| 2011/0138082 A1 | 6/2011 | Khatri | |
| 2011/0138185 A1 | 6/2011 | Ju et al. | |
| 2012/0005480 A1 | 1/2012 | Batke et al. | |
| 2012/0084420 A1* | 4/2012 | Ayanam et al. | 709/223 |
| 2012/0093023 A1 | 4/2012 | Ficet et al. | |
| 2012/0151223 A1* | 6/2012 | Conde Marques et al. | 713/193 |
| 2012/0239928 A1 | 9/2012 | Judell | |
| 2012/0311332 A1* | 12/2012 | Johnsen et al. | 713/168 |
| 2012/0311682 A1* | 12/2012 | Johnsen et al. | 726/5 |
| 2013/0003976 A1* | 1/2013 | An et al. | 380/277 |
| 2013/0046904 A1 | 2/2013 | Hilland | |
| 2013/0138836 A1 | 5/2013 | Cohen et al. | |
| 2013/0179870 A1 | 7/2013 | Kelso | |
| 2013/0191622 A1 | 7/2013 | Sasaki | |
| 2013/0259033 A1 | 10/2013 | Hefty | |
| 2014/0095853 A1 | 4/2014 | Sarangshar | |
| 2014/0095876 A1 | 4/2014 | Smith et al. | |
| 2014/0101653 A1* | 4/2014 | Dharmadhikari et al. | 717/173 |

FOREIGN PATENT DOCUMENTS

| | | |
|---|---|---|
| WO | 01/90838 A2 | 11/2001 |
| WO | 2012037518 | 3/2012 |

OTHER PUBLICATIONS

Zhuo, Haihong, Jianwen Yin, Ph.D, and Anil V. Rao. "Remote Management with the Baseboard Management Controller in Eighth-Generation Dell PowerEdge Servers." Dell. N.p., Oct. 2004. Web. Dec. 17, 2014. <http://www.dell.com/downloads/global/power/ps4q04-20040110-zhuo.pdf>.*

Lee, M. et al., Security Enhancement in Infiniband Architecture, Proceedings of the 19th IEEE International Parallel and Distributed Processing Symposium, Denver, Colorado, Apr. 4-8, 2005, Piscataway, New Jersey, Apr. 4, 2005, 18 pages.

Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.

InfiniBand(Service Mark) Trade Association, InfiniBand(Trade Mark) Architecture Specification, vol. 1, Release 1.2.1, Nov. 2007, pp. 1-1727.

International Search Report dated Sep. 23, 2013 for Application No. PCT/US2013/040639, 10 pages.

International Search Report dated Sep. 26, 2013 for Application No. PCT/US2013/040656, 10 pages.

European Patent Office, International Searching Authority, International Search Report and Written Opinion dated Mar. 25, 2015 for International Application No. PCTUS2014059949, 12 pages.

Mellanox Technologies, "Boot over IB (BoIB) User's Manual Rev 1.0", © copyright 2008, 28 pages, retrieved Apr. 7, 2015 from: <http://www.mellanox.com/pdf/BoIB/Boot-over-IB_User_Manual_1_0.pdf>.

Mellanox Technologies, "InfiniScale® IV 8-Port QSFP 40 Gb/s InfiniBand Switch User Manual Rev 1.4", © copyright 2012, 55 pages, retrieved Apr. 7, 2015 from: <http://www.mellanox.com/related-docs/user_manuals/IS5022_User_Manual.pdf>.

State Intellectual Property Office of the People's Republic of China, Search Report dated Sep. 9, 2015 for Chinese Patent Application No. 201280027279.1, 2 page.

Tom Shanley, Infiniband Network Architecture (excerpt), Pearson Education, Published 2002, p. 213.

* cited by examiner

SYSTEM AND METHOD FOR SUPPORTING IN-BAND/SIDE-BAND FIRMWARE UPGRADE OF INPUT/OUTPUT (I/O) DEVICES IN A MIDDLEWARE MACHINE ENVIRONMENT

CROSS REFERENCE TO RELATED APPLICATIONS

This application is related to the following patent applications, each of which is hereby incorporated by reference in its entirety:

U.S. patent application titled "SYSTEM AND METHOD FOR PROVIDING SECURE SUBNET MANAGEMENT AGENT (SMA) IN AN INFINIBAND (IB) NETWORK", application Ser. No. 13/487,973, filed Jun. 27, 2012; and U.S. patent application titled "SYSTEM AND METHOD FOR HOST-BASED FIRMWARE UPGRADE OF INPUT/OUTPUT (I/O) DEVICES IN A MIDDLEWARE MACHINE ENVIRONMENT", application Ser. No. 14/098,030, filed Dec. 5, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a middleware machine environment.

BACKGROUND

As larger cloud computing architectures are introduced, the performance and administrative bottlenecks associated with the traditional network and storage have become a significant problem. The InfiniBand (IB) technology has seen increased deployment as the foundation for a cloud computing fabric. This is the general area that embodiments of the invention are intended to address.

SUMMARY

Described herein are systems and methods that can support controlled and secure firmware upgrade in a middleware machine environment. The system can provide an input/output (I/O) device, which is associated with a host node. The host node can use the I/O device to connect to a shared resource, and the I/O device operates to receive at least one of a firmware image and a firmware update from a fabric administrator that manages the shared resource, and upgrade firmware in the I/O device. Furthermore, the system allows the fabric administrator to send said at least one of a firmware image and a firmware update to the I/O device, using either an in-band path or a side-band path.

DETAILED DESCRIPTION

Figure 1:
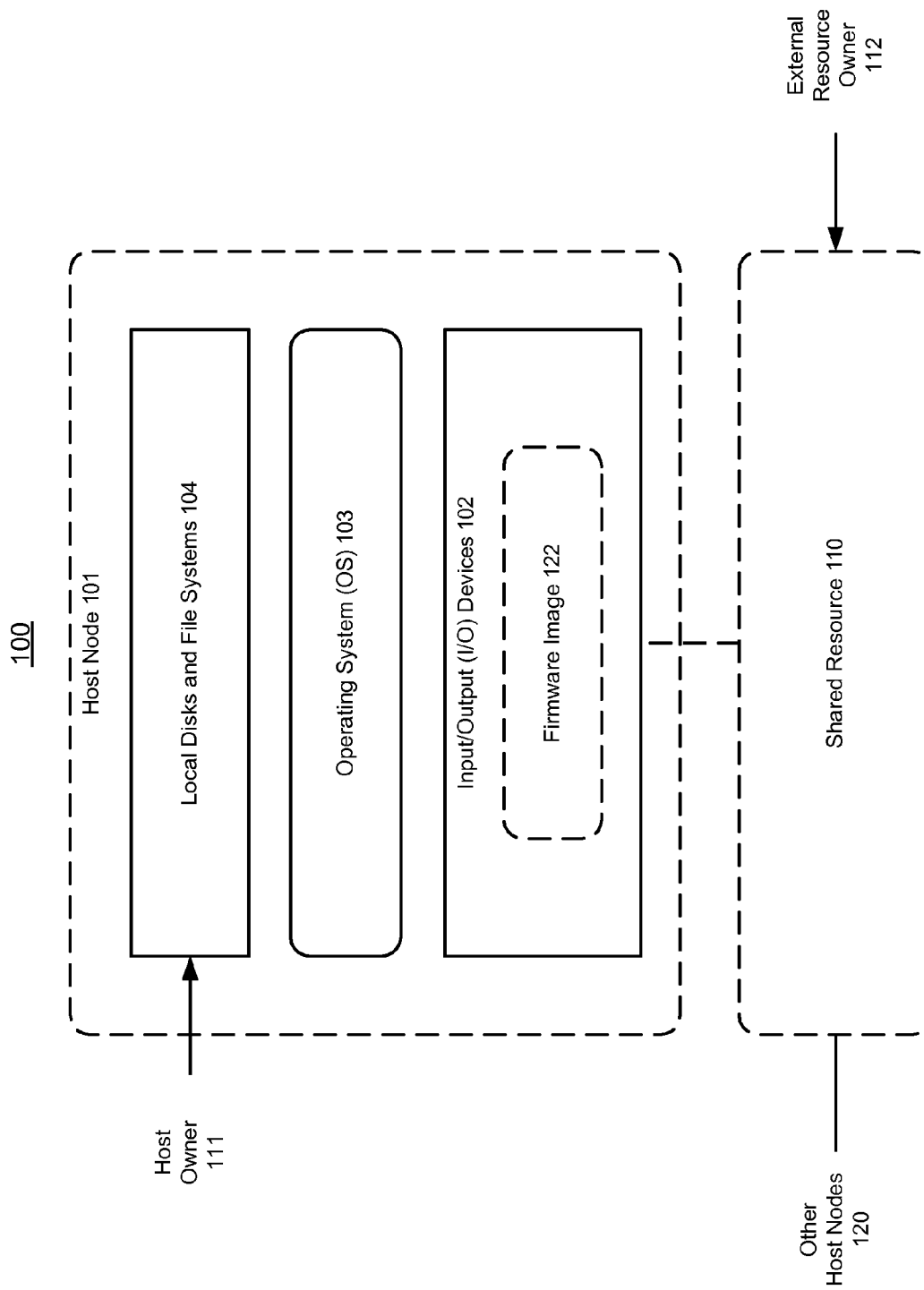
FIG. 1 shows an illustration of supporting device firmware upgrade in a middleware machine environment, in accordance with an embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Infiniband (IB) network as an example for a high performance network. It will be apparent to those skilled in the art that other types of high performance networks can be used without limitation.

Described herein are systems and methods that can support controlled and secure firmware upgrade in a middleware machine environment.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the subnet including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, including a send queue (SQ) and a receive queue (RQ). There is one such pair present at each end-node that is participating in the communication. The send queue holds work requests to be transferred to the remote node, while the receive queue holds information on what to do with the data received from the remote node. In addition to the QPs, each HCA can have one or more completion queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow). Also, SMPs can use either the routing that the SM sets up based on end-port Local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change, to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions as the host port is supposed to be a member of (i.e. in essence equivalent to switch enforced VLAN control in Ethernet LANs).

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and are controlled independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

The Upgrade of Device Firmware

FIG. 1 shows an illustration of supporting device firmware upgrade in a middleware machine environment, in accordance with an embodiment of the invention. As shown in FIG. 1, a host node 101 in a middleware machine environment 100 can be connected with other host nodes 120 via a shared resource 110, such as an IB fabric.

The host node 101 can be controlled by an operating system (OS) 103, a hypervisor or a host owner 111 (e.g. a host administrator), while the shared resource 110 can be controlled by an external resource owner 112 (e.g. a fabric administrator). Furthermore, the host node 101 can include various computer devices, such as I/O devices 102 that can interface the host node 101 to the shared resource 110.

The system can perform firmware upgrade on these computer devices, so that these computer devices can function appropriately. A valid firmware image 122 on the I/O devices 102 can ensure that the behavior of the I/O device 102 relative to the shared resource 110, and the identity and the authentication schemes that the I/O device 102 uses relative to the shared resources 110 may not be compromised.

For example, a firmware upgrade operation can be performed via the host node 101. Here, performing a firmware upgrade operation via the host node 101 implies that there is a need for the external resource owner 112 to access the host node 101 that contains the device 102.

In accordance with an embodiment of the invention, the system can implement a trust model for the I/O devices 102, so that the integrity of the firmware image 122 on the I/O device 102 can be controlled. For example, the system can use a password controlled by the I/O device 102, to grant access for supporting firmware upgrade on the I/O device 102.

On the other hand, as long as the firmware upgrade on I/O devices 102 depends on indirect access, such as via the physical host node 101, the upgrade of device firmware has an inherent element of trusting the host system on the physical host node 101. From the perspective of the shared resource 110, the host node 101, where the I/O devices 102 resides, may not be fully trusted for performing firmware upgrade on the I/O devices 102.

Thus, performing firmware upgrade on I/O devices 102 via the physical host node 101 can potentially represent problems for both the external resource owner 112 and the host owner 111. In the case of the external resource owner 112, trusting the host system 101 represents a risk of spyware on the host system 101, which may be able to observe the password for performing firmware upgrade on I/O devices 102. In the case of the host owner 111, the external resource owner 112 may have access to additional information/resources on the local host system 101 (e.g. the local disks and filing systems 104) that may not be needed for performing the upgrade of firmware image 122 on the I/O devices 102.

Special Boot Image

Figure 2:
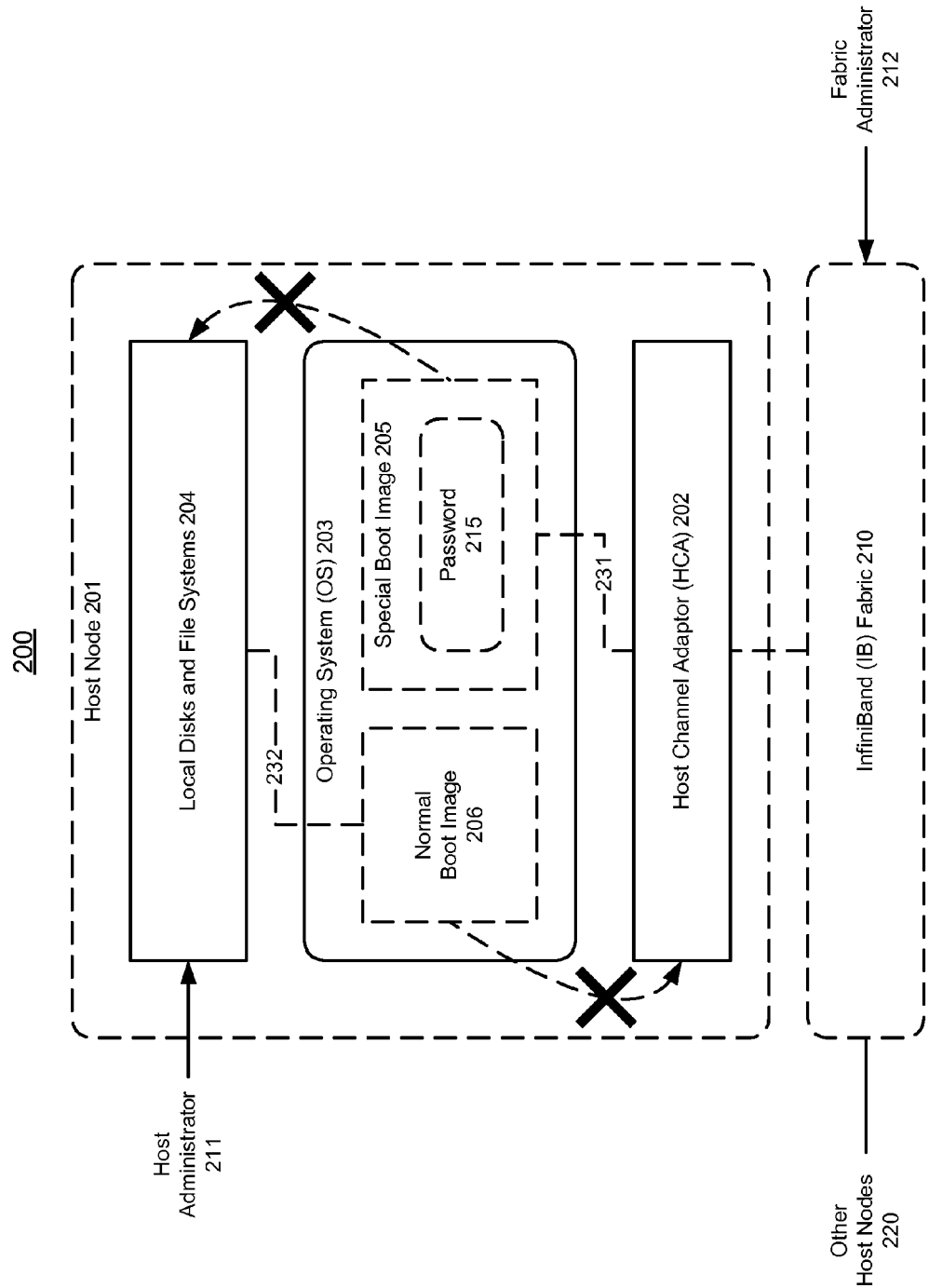
FIG. 2 shows an illustration of supporting controlled and secure firmware upgrade in a middleware machine environment, in accordance with an embodiment of the invention.

FIG. 2 shows an illustration of supporting controlled and secure firmware upgrade in a middleware machine environment, in accordance with an embodiment of the invention. As shown in FIG. 2, a host node 201 in a middleware machine environment 200 can be connected with other host nodes 220 via an IB fabric 210. The host node 201 can be controlled by a host administrator 211, while the IB fabric 210 can be controlled by a fabric administrator 212. Furthermore, the host node 201 can include various devices, e.g. a host channel adaptor (HCA) 202 that can interface the host node 201 to the IB fabric 210.

In accordance with an embodiment of the invention, a special boot image 205 of the host operating system (OS) 203 can control the usage of the HCA 202 on the host node 201 (shown as the dashed line 231). The special boot image 205 can authenticate itself with the fabric administrator 212, and may not be accessed by anyone else, including the host administrator 211. Additionally, the special boot image 205 can contain a password 215 that can be used for securing the upgrading of the firmware on the HCA 202.

As shown in FIG. 2, a normal boot image 206 can control the access to the local disks and file systems 204 (shown as the dashed line 232). For example, the local disks and file systems 204 can be protected by different passwords that may only be known by the normal boot image 206. Also, the special boot image 205 may be configured not having access to local information on the host node 201.

Thus, using the special boot image 205, the system can ensure security for both the fabric administrator 212 and host administrator 211. In the case of the fabric administrator 212, there can be no risk of spyware on the host system 201, since the host administrator 211 does not have access to the HCA 202. On the other hand, the host system 201 can be confident that the fabric administrator 212 will avoid having access to the local disks and file systems 204 in the host node 201.

Host-Based Firmware Upgrade

In accordance with an embodiment of the invention, a host local firmware upgrade scheme can ensure that the physical access to the input/output (I/O) device, e.g. a host channel adaptor (HCA), is under the control of the host owner, such as a host administrator, while the integrity of the firmware image for the I/O device can be fully controlled by the owner of the external resource, such as the fabric administrator and/or the device vendor.

Figure 3:
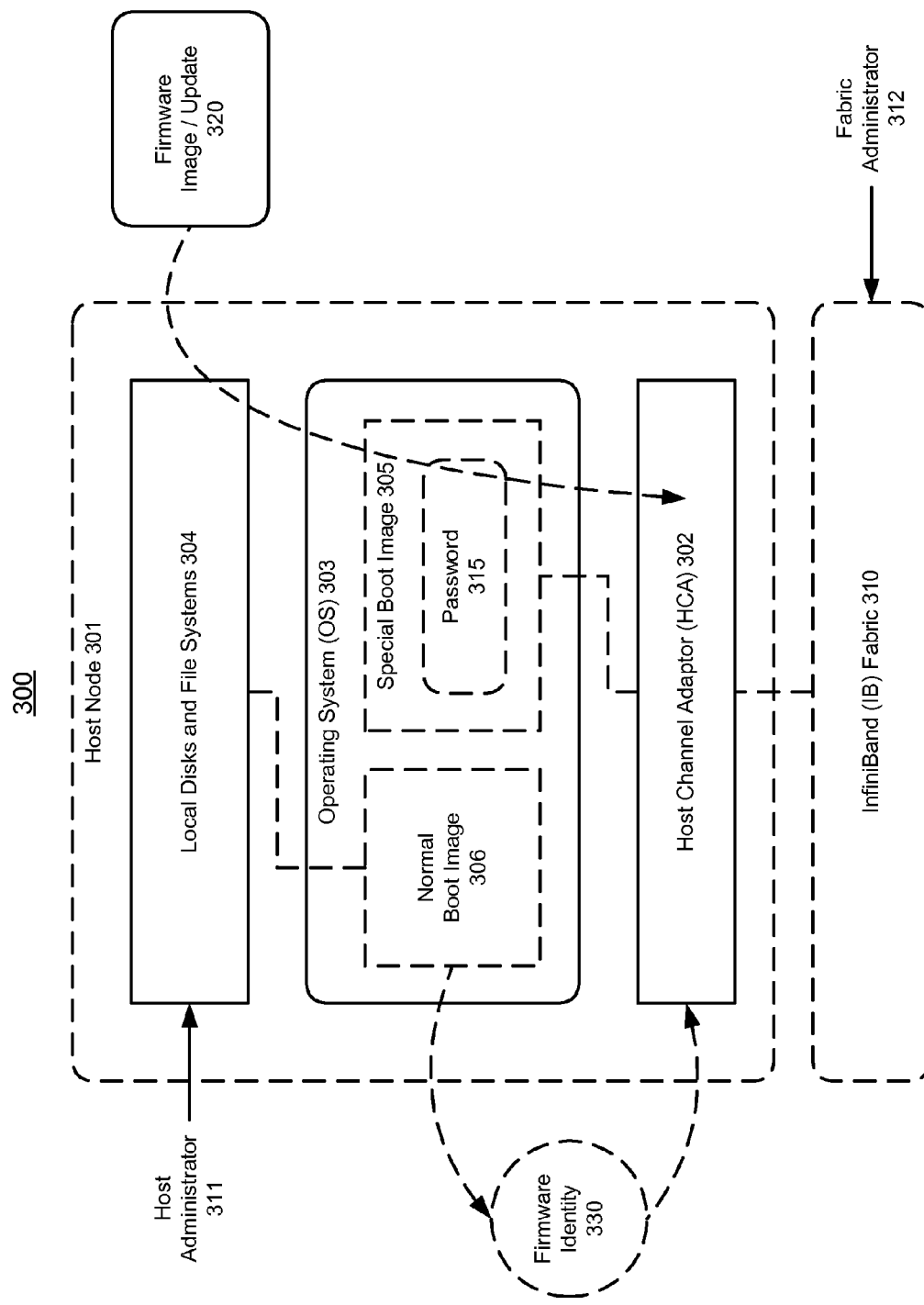
FIG. 3 shows an illustration of supporting a host local firmware upgrade via a special boot image in a middleware machine environment, in accordance with an embodiment of the invention.

FIG. 3 shows an illustration of supporting a host local firmware upgrade via a special boot image in a middleware machine environment, in accordance with an embodiment of the invention. As shown in FIG. 3, a host node 301 in a middleware machine environment 300 can be connected to an IB fabric 310. The host node 301 can be controlled by a host administrator 311, while the IB fabric 310 can be controlled by a fabric administrator 312. Furthermore, the host node 301 can include various I/O devices, e.g. the HCA 302, that can interface the host node 301 to the IB fabric 310.

A special boot image 305 of the host operating system (OS) 303 can control the upgrade of the firmware image on HCA 302. Additionally, the special boot image 305 can contain a password 315 that can be used for securing the upgrading of the firmware on the HCA 302. Here, the special boot image 305 may not have access to the local disks and file system 304. On the other hand, a normal boot image 306 can control the access to the local disks and file system 304, without controlling the I/O device, HCA 302.

As shown in FIG. 3, a firmware image/update 320 can be transferred into the HCA 302 via the host node 301 using the special boot image 305. This system can ensure that the physical access to HCA 302 is under the control of the host administrator 311, while the integrity of the firmware image for the I/O device 302 can be fully controlled by the fabric administrator 312.

In accordance with an embodiment of the invention, the host administrator 311 can specify and control the legal version of a firmware image that the HCA 302 can be upgraded to. For instance, there may be two firmware image versions that are both relevant from the perspective of the fabric administrator 312, while the host administrator 311 has a requirement on one specific version.

In such a case, the host administrator 311, which has access to the local disks and file system 304 and a normal boot image 306, can instruct the local logic on the HCA 302, which controls the firmware upgrade process, about the required firmware image identity 330 that can be used for upgrade.

Furthermore, the host administrator 311 can fully control the specific time when a firmware upgrade is taking place. For example, the host administrator 311 can request that a firmware upgrade to be initiated, using the requested firmware identity 330 that has been stored persistently at the HCA 302 to define the firmware image that can be used for upgrade.

Additionally, an impact of performing firmware upgrade on a HCA 302 via special host boot image 315 is that any workload currently executing on the host node 301 may need to be terminated.

Figure 4:
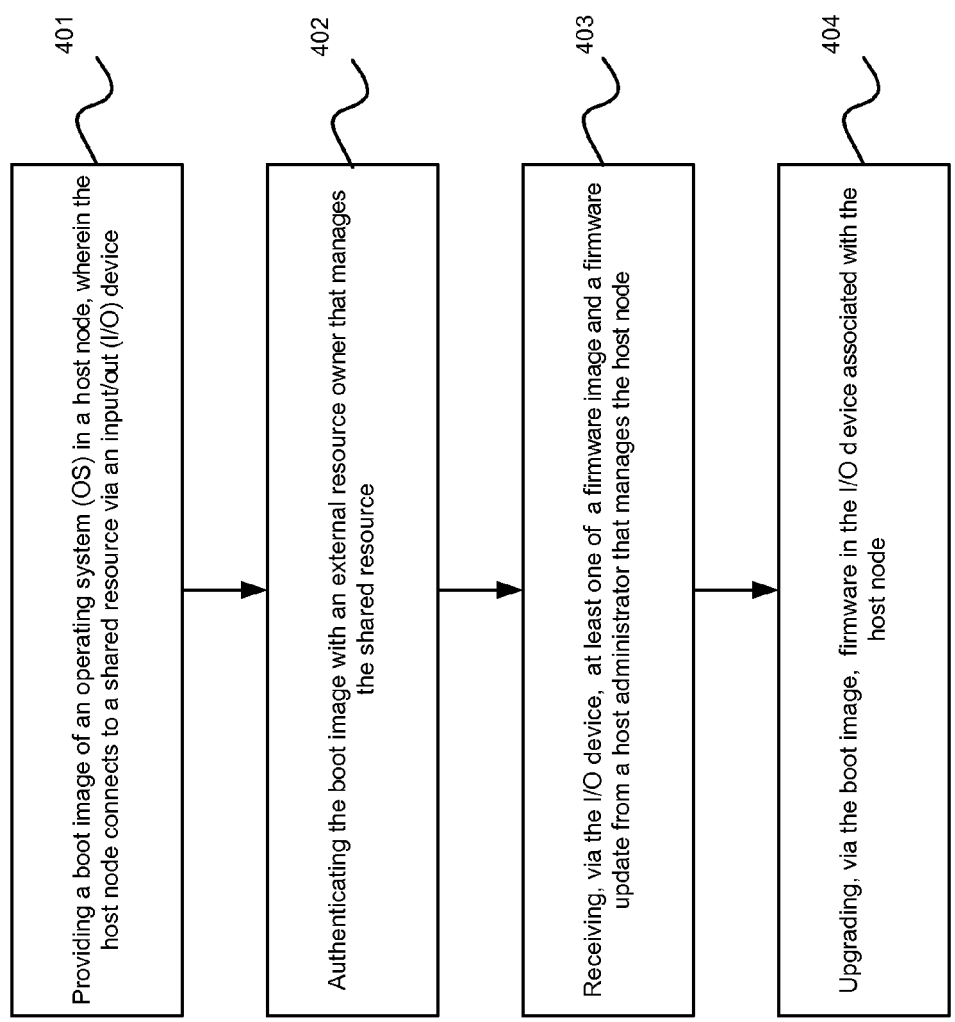
FIG. 4 illustrates an exemplary flow chart for supporting a host local firmware upgrade via a special boot image in a middleware machine environment, in accordance with an embodiment of the invention.

FIG. 4 illustrates an exemplary flow chart for supporting a host local firmware upgrade via a special boot image in a middleware machine environment, in accordance with an embodiment of the invention. As shown in FIG. 4, at step 401, the system can provide a boot image of an operating system (OS) in a host node, wherein the host node connects to a shared resource via an input/out (I/O) device. Then, at step 402, the boot image can authenticate itself with an external resource owner that manages the shared resource. Furthermore, at step 403, the I/O device can receive at least one of a firmware image and a firmware update from a host administrator that manages the host node, and at step 404, the boot image can upgrade firmware in a device associated with the host node.

Figure 5:
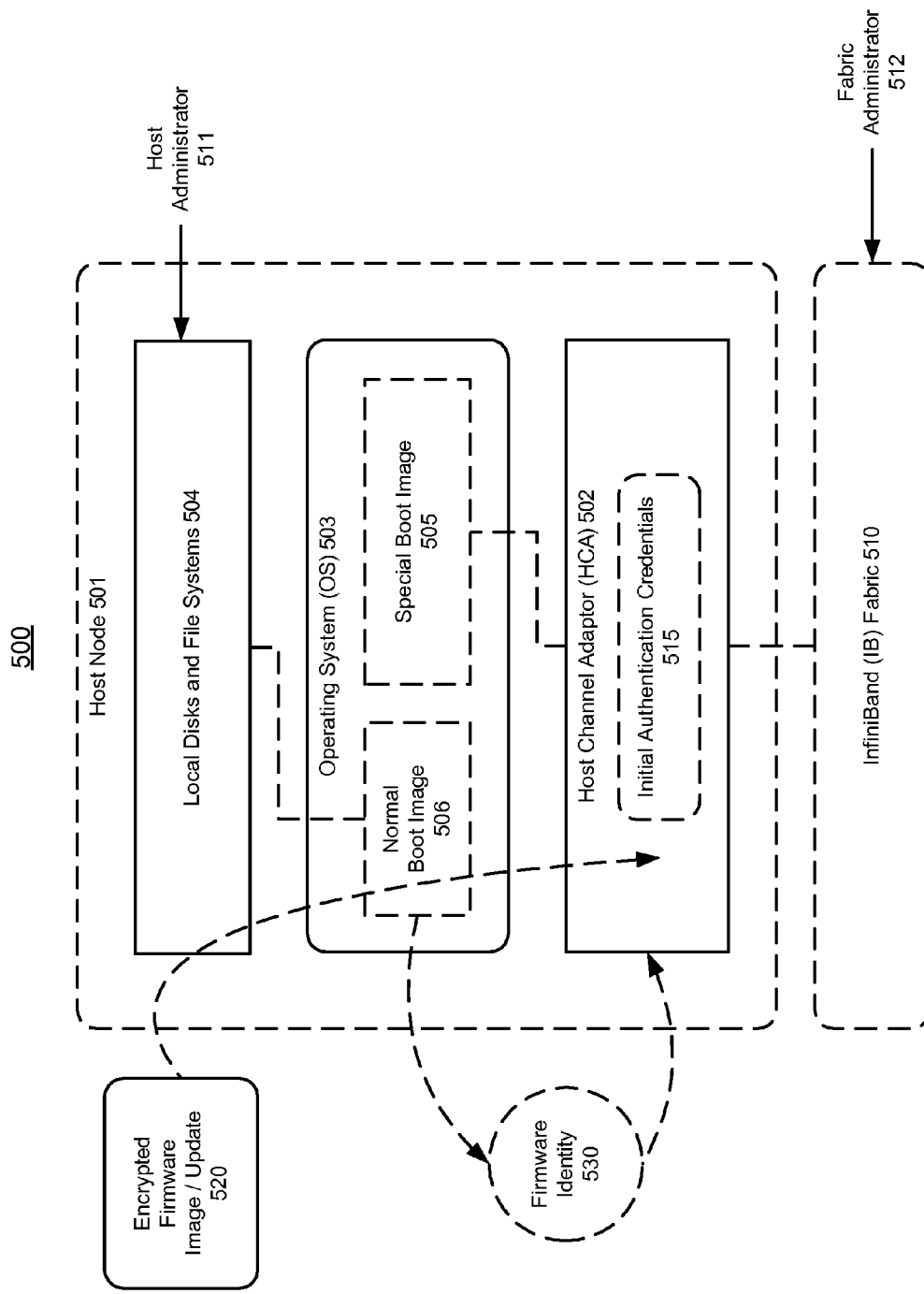
FIG. 5 shows an illustration of supporting a host local firmware upgrade via a normal boot image in a middleware machine environment, in accordance with an embodiment of the invention.

FIG. 5 shows an illustration of supporting a host local firmware upgrade via a normal boot image in a middleware machine environment, in accordance with an embodiment of the invention. As shown in FIG. 5, a host node 501 in a middleware machine environment 500 can be connected to an IB fabric 510. The host node 501 can be controlled by a host administrator 511, while the IB fabric 510 can be controlled by a fabric administrator 512. Furthermore, the host node 501 can use an operating system (OS) 503 and can include various I/O devices 502, e.g. a HCA 502 that can interface the host node 501 to the IB fabric 510.

In accordance with an embodiment of the invention, instead of using a special boot image 505, a normal OS boot image 506, which controls the local disks and file systems 504, can be used to update the firmware image on the HCA 502.

As shown in FIG. 5, an encrypted firmware image/update 520 can be transferred into the HCA 502 via the host node 501 using the normal OS boot image 506. Here, the firmware image update 520 can be encrypted in a way that the HCA 502 is able to decrypt and authenticate.

Thus, the HCA 502 can prevent the firmware image on the HCA 502 from being easily manipulated by the host node 501 without permission. Additionally, when the HCA 502 detects that a firmware image update 502 has been compromised or when the firmware image update 502 has not been authenticated as representing a valid image, the HCA 502 can refuse to install the firmware image update 520.

In accordance with an embodiment of the invention, initial authentication credentials 515 can be installed on the HCA 502, e.g. during the production stage. The initial authentication credentials 515 allows encrypted authentication without any initial password or key distribution. Subsequently, during the firmware upgrade stage, the system can transfer a new firmware image 520, which is in an encrypted form, into the HCA 502 via the host node 501. Then, the HCA 502 can decrypt the encrypted firmware image 520, and store encrypted firmware image 520 on the device itself.

In accordance with an embodiment of the invention, the host administrator 511 can specify and control the legal firmware image version that the HCA 502 should be upgraded to.

Similarly to the case as shown in FIG. 3, the host administrator 511 can instruct the local logic on the HCA 502, which controls the firmware upgrade process, about the required firmware image identity 530 that can be used for firmware upgrade.

Furthermore, the host administrator 311 can fully control the specific time when an upgrade is taking place. For example, the host administrator 511 can request that a firmware upgrade to be initiated, using the requested firmware identity 530, which has been stored persistently on the HCA 502 to define the firmware image that can be used for the upgrade.

Unlike the case as shown in FIG. 3, in the case of encrypted firmware upgrade via the normal host boot image 506, the system may not require for host re-boot. Thus, the existing workload on the host node 501 may continue being executed.

Figure 6:
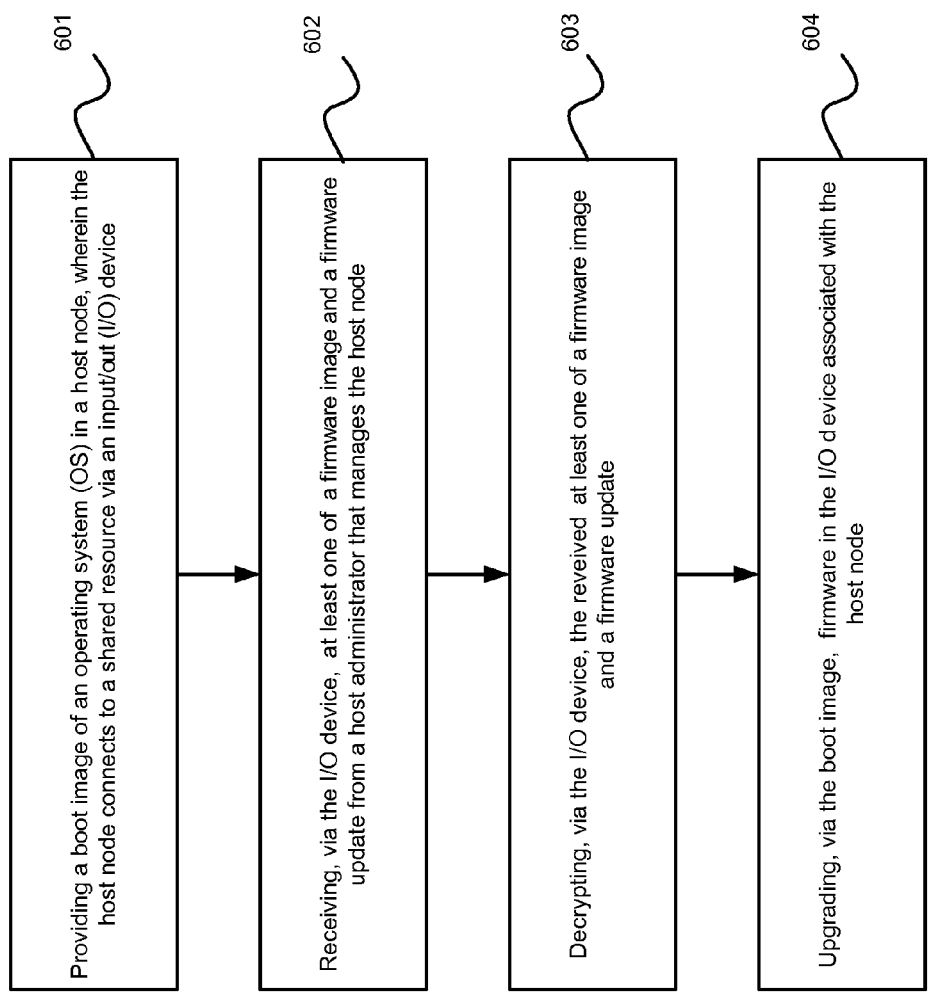
FIG. 6 illustrates an exemplary flow chart for supporting a host local firmware upgrade via a normal boot image in a middleware machine environment, in accordance with an embodiment of the invention.

FIG. 6 illustrates an exemplary flow chart for supporting a host local firmware upgrade via a normal boot image in a middleware machine environment, in accordance with an embodiment of the invention. As shown in FIG. 6, at step 601, the system can provide a boot image of an operating system (OS) in a host node, wherein the host node connects to a shared resource. Then, at step 602, the I/O device can receive at least one of a firmware image and a firmware update from a host administrator that manages the host node. Furthermore, at step 603, the I/O device can decrypt the received at least one of a firmware image and a firmware update, and at step 604, the boot image can upgrade a firmware in a device associated with the host node.

In-Band/Side-Band Firmware Upgrade

In accordance with an embodiment of the invention, the system can update the firmware on the input/output (I/O) device, e.g. a host channel adaptor (HCA), with a firmware image/update that is transferred into the HCA, using either an in-band path or a side-band path. In either case, the system can have no dependency on the host system, and may not need to access the local host resources during the firmware upgrade.

Figure 7:
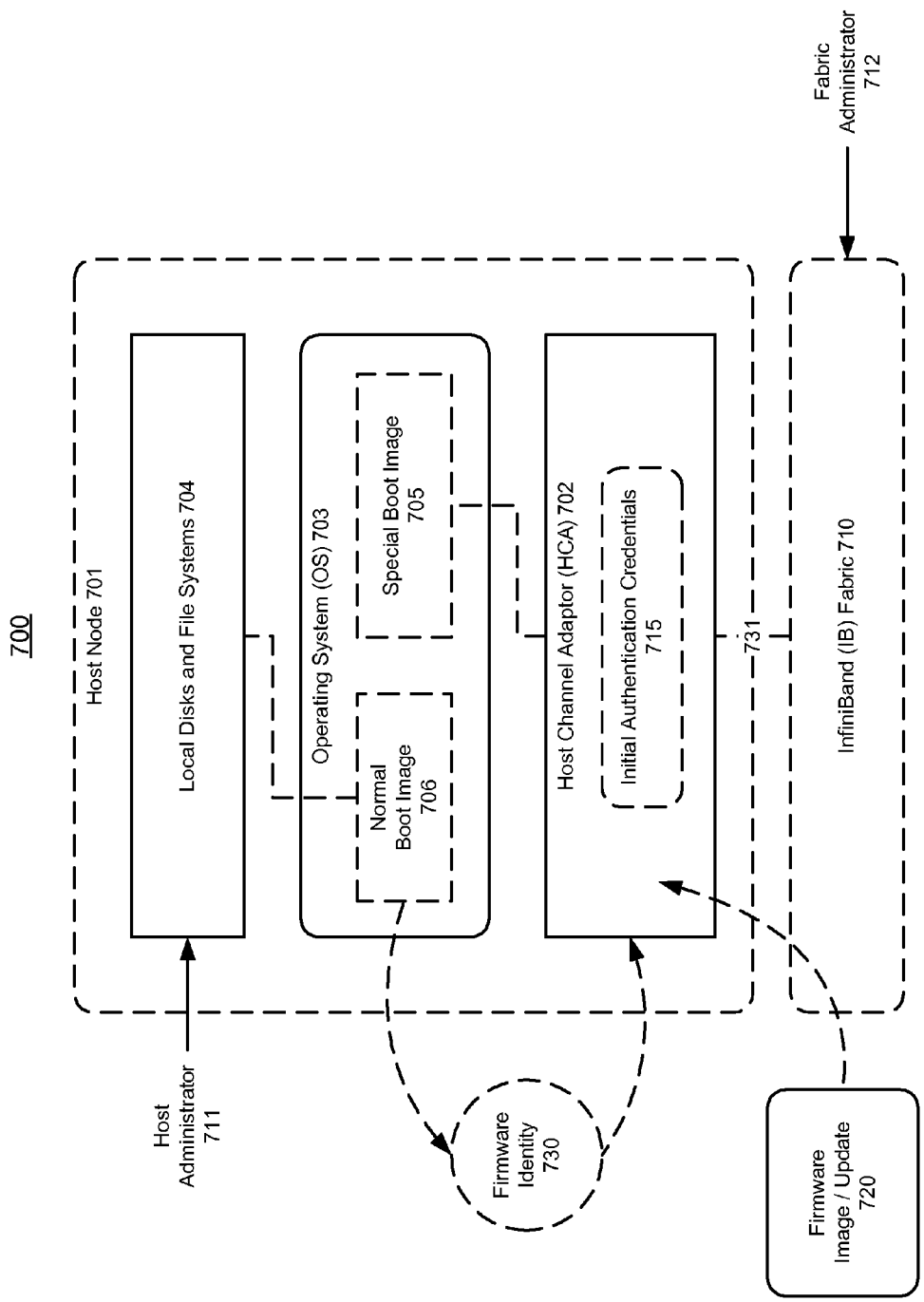
FIG. 7 shows an illustration of supporting an in-band firmware upgrade in a middleware machine environment, in accordance with an embodiment of the invention.

FIG. 7 shows an illustration of supporting an in-band firmware upgrade in a middleware machine environment, in accordance with an embodiment of the invention. As shown in FIG. 7, a host node 701 in a middleware machine environment 700 can be connected to an IB fabric 710. The host node 701 can be controlled by a host administrator 711, while the IB fabric 710 can be controlled by a fabric administrator 712.

Furthermore, the host node 701 can use an operating system (OS) 703, which can be based on a normal boot image 706 that can have access to local disks and file systems 704. Also, the host node 701 can include various I/O devices, e.g. the HCA 702, that can interface the host node 701 to the IB fabric 710.

As shown in FIG. 7, a firmware image/update 720 can be transferred into the HCA 702 in-band via the IB fabric 710 using an in-band path 731, instead of based on a special boot image 705.

The firmware image update 720 can be encrypted in a way that the HCA 702 is able to decrypt and authenticate. Thus, the HCA 702 can prevent the firmware image on the HCA 702 from being easily manipulated by the host node 701 without permission. Additionally, when the HCA 702 detects that a firmware image update 702 has been compromised or when the firmware image update 720 has not been authenticated representing a valid image, the HCA 702 can refuse to install the firmware image update 720.

In accordance with an embodiment of the invention, initial authentication credentials 715 can be installed on the HCA 702, e.g. during the production stage. The initial authentication credentials 715 allows encrypted authentication without any initial password or key distribution. Subsequently, during the firmware upgrade stage, the system can transfer a new firmware image 720, which is in an encrypted form, into the HCA 702 in-band. Then, the HCA 702 can decrypt the encrypted firmware image 720, and store the firmware image 720 on the device itself.

Alternatively, when a management access to the network fabric, i.e. the in-band path 731, is authenticated and secure, the HCA 702 allows the firmware update 720 to be un-encrypted, since the management access can ensure the firmware update 720 to be authenticated and secure.

In accordance with an embodiment of the invention, the host administrator 711 can specify and control the legal firmware image version that the HCA 702 should be upgraded to.

Similarly to the case as shown in FIG. 3, the host administrator 711 can instruct the local logic on the HCA 702, which controls the firmware upgrade process, about the required firmware image identity 730 that can be used for firmware upgrade.

Unlike the case as shown in FIG. 3, in the case of in-band firmware upgrade via the fabric 710, the host administrator 711 may not be able to directly control when an upgrade is taking place, because the path 731 via the fabric 710 to the HCA 702 is not controlled by the host administrator 711.

On the other hand, the host administrator 711 can use the requested firmware image version 730, stored in a persistent storage associated with the HCA 702, to control when an upgrade can take place. For example, in the case when a fabric administrator 712 initiates an in-band firmware upgrade by mistake, the system can ensure that such an update may have no effect as long as the host administrator 711 does not enable the upgrade in the first place.

Thus, the host administrator 711 can be responsible for controlling what legal firmware image to use for upgrade and when such upgrade can take place, while the fabric administrator 712 can ensure that the validness and integrity of the firmware image 720 may not be compromised by any host administrator 711.

Also, when multiple redundant HCAs or other I/O devices are present on the host node 701, the system can upgrade the firmware image on each HCA or other I/O device in a rolling fashion, without requiring the host node 701 loosing access to the shared resource, such as the IB fabric 710, at any point in time.

Figure 8:
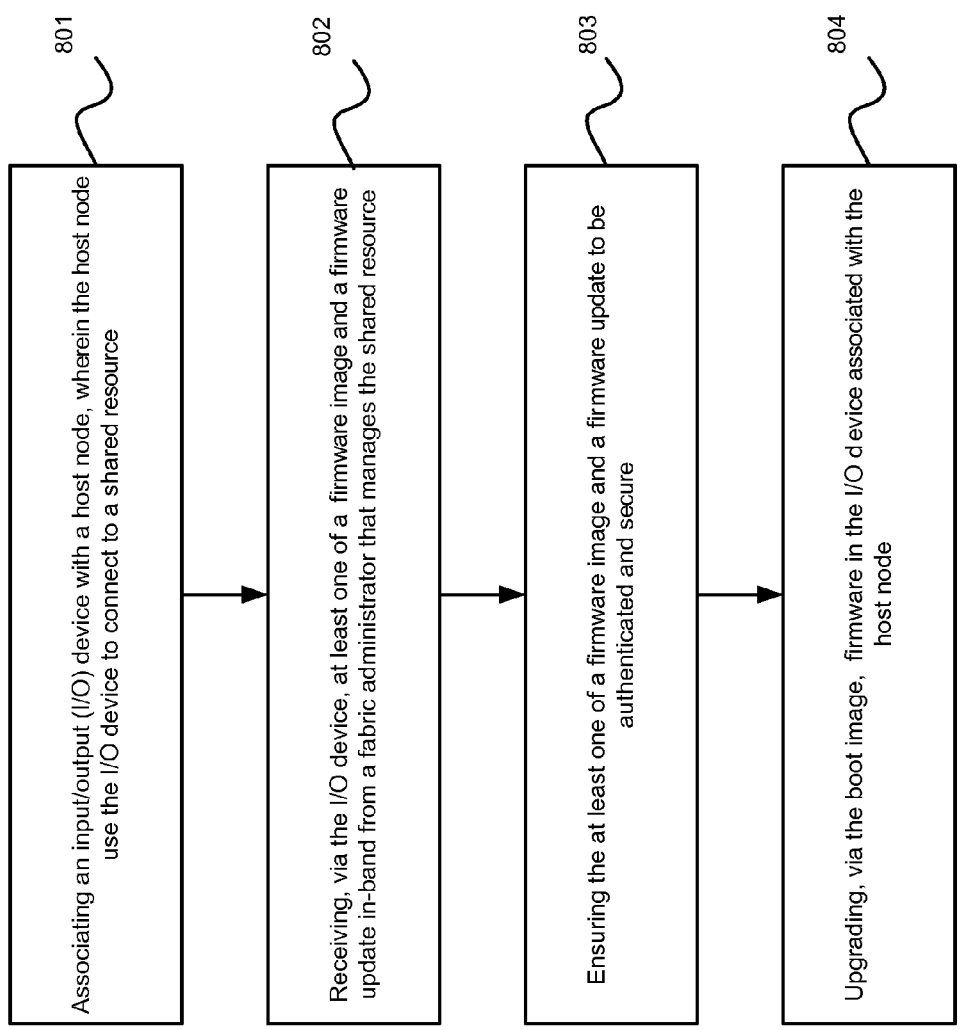
FIG. 8 illustrates an exemplary flow chart for supporting an in-band firmware upgrade in a middleware machine environment, in accordance with an embodiment of the invention.

FIG. 8 illustrates an exemplary flow chart for supporting an in-band firmware upgrade in a middleware machine environment, in accordance with an embodiment of the invention. As shown in FIG. 8, at step 801, the system can associate an input/output (I/O) device with a host node, wherein the host node can use the I/O device to connect to a shared resource. Then, at step 802, the I/O device can receive at least one of a firmware image and a firmware update from a fabric administrator that manages the shared resource. Furthermore, at step 803, the system can ensure that the received at least one of a firmware image and a firmware update is authenticated and secure, and at step 804, the boot image can upgrade a firmware in a device associated with the host node.

Figure 9:
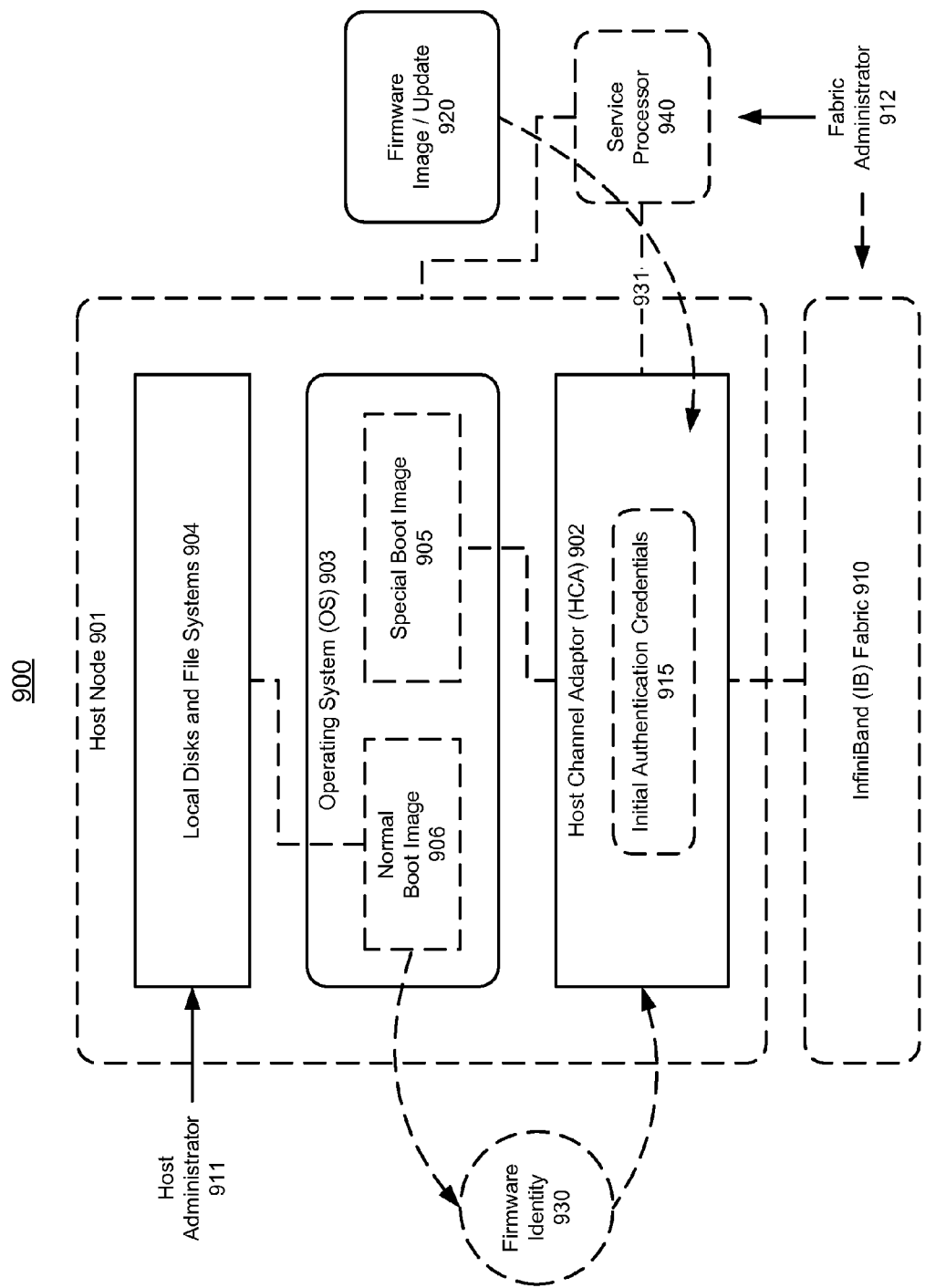
FIG. 9 shows an illustration of supporting a side-band firmware upgrade in a middleware machine environment, in accordance with an embodiment of the invention.

FIG. 9 shows an illustration of supporting a side-band firmware upgrade in a middleware machine environment, in accordance with an embodiment of the invention. As shown in FIG. 9, a host node 901 in a middleware machine environment 900 can be connected to an IB fabric 910. The host node 901 can be controlled by a host administrator 911, while the IB fabric 910 can be controlled by a fabric administrator 912.

Furthermore, the host node 901 can use an operating system (OS) 903, which can be based on a normal boot image 906 that can have access to local disks and file systems 904. Also, the host node 901 can include various I/O devices, e.g. the HCA 902, that can interface the host node 901 to the IB fabric 910.

In accordance with an embodiment of the invention, the system can perform a side-band firmware upgrade on the HCA 902, instead of based on a special boot image 705. As shown in FIG. 9, a firmware image/update 920 can be transferred into the HCA 702 via a side-band path 931 between a service processor 940 on the host node 901 and the HCA 902.

The service processor 940 on the host node 901 can operate independently of the normal host boot image 906 on the main processor(s) of the host node 901. Thus, the system may have no dependency on the host system 901, and the system may not need to access the local host node 901 during the firmware upgrade.

In accordance with an embodiment of the invention, the service processor 940 can provide secure and authenticated access to the HCA 902 for the fabric administrator 912, and can deny the same access by the local host administrator 911.

Thus, the side-band approach can provide the same benefits as that the in-band approach can provide. For example, the firmware image update 920 can be encrypted in a way that the HCA 902 is able to decrypt and authenticate. Also, initial authentication credentials 915 can be installed on the HCA 902 during the production stage. Alternatively, when a management access on the in-band path is authenticated and secure, the HCA 902 allows the firmware update 920 to be un-encrypted. Also, the host administrator 911 can use the requested firmware image version 930, stored in a persistent storage associated with the HCA 902, to control when an upgrade can take place.

Figure 10:
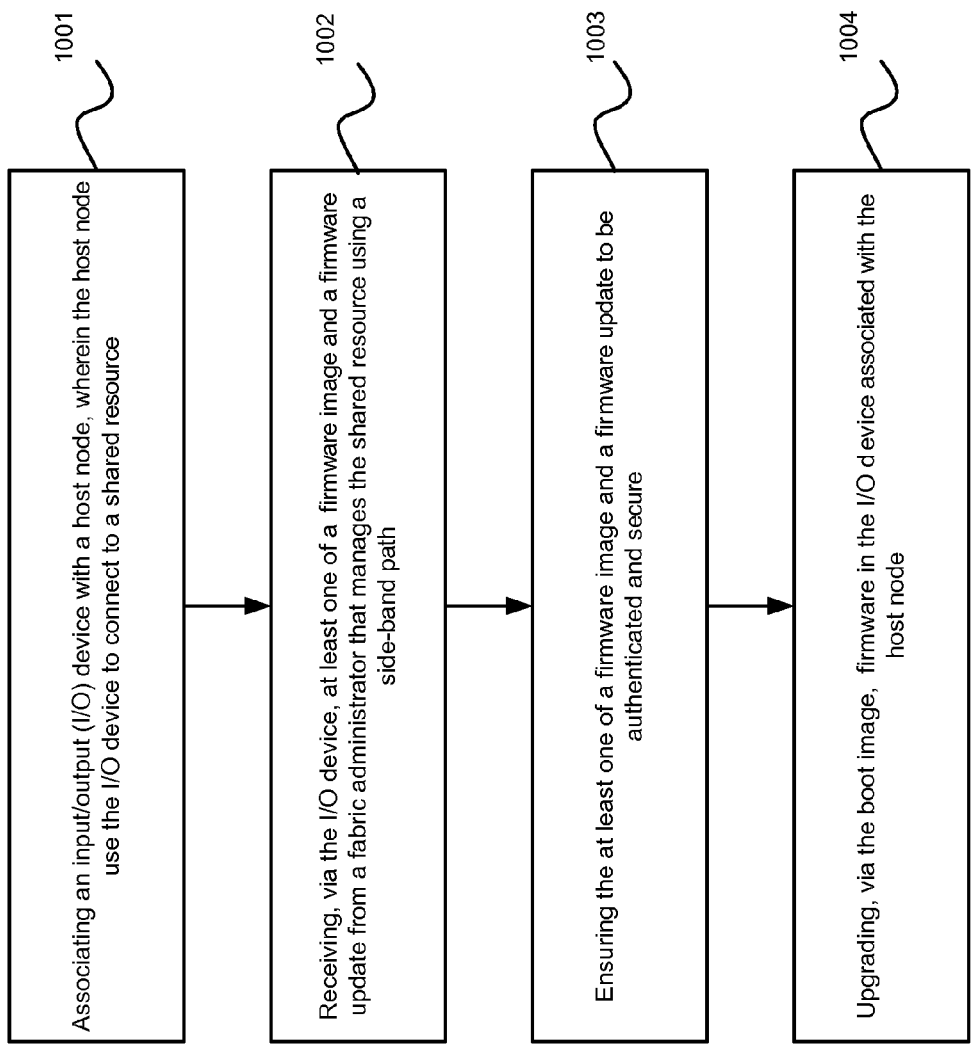
FIG. 10 illustrates an exemplary flow chart for supporting a side-band firmware upgrade in a middleware machine environment, in accordance with an embodiment of the invention.

FIG. 10 illustrates an exemplary flow chart for supporting a side-band firmware upgrade in a middleware machine environment, in accordance with an embodiment of the invention. As shown in FIG. 10, at step 1001, the system can associate an input/output (I/O) device with a host node, wherein the host node can use the I/O device to connect to a shared resource. Then, at step 1002, the I/O device can receive at least one of a firmware image and a firmware update from a fabric administrator that manages the shared resource using a side-band path. Furthermore, at step 1003, the system can ensure that the received at least one of a firmware image and a firmware update is authenticated and secure, and at step 804, the boot image can upgrade firmware in the I/O device associated with the host node.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting controlled and secure firmware update of a host channel adapter (HCA) of a host node in a middleware machine environment, wherein the host node uses the HCA to connect to a shared resource over a network fabric, the method comprising:

managing the network fabric with a fabric administrator system;

providing the host node with a normal boot image which provides access to a local file system of the host node but no access to firmware of the HCA of the host node, wherein when loaded with the normal boot image, the host node is accessible to a host administrator and not the fabric administrator system;

providing the host node with a special boot image which provides access to firmware of the HCA of the host node but no access to the local file system of the host node, wherein when loaded with the special boot image, the host node is accessible to a fabric administrator system and not the host administrator;

using the fabric administrator system to provide a plurality of encrypted firmware updates on the network fabric;
receiving said plurality of encrypted firmware updates from the network fabric at said host node via the HCA;
communicating a selection of a particular encrypted firmware update of the said plurality of encrypted firmware updates from a host administrator of the host node to the HCA, wherein said communicating is performed while the host node is loaded with the normal boot image;
decrypting in said HCA, in response to said selection, said particular encrypted firmware update of the said plurality of encrypted firmware updates in order to generate a decrypted firmware update; and
operating said HCA to install said decrypted firmware update;
wherein said decrypting and operating said HCA to install said decrypted firmware is performed while the host node is loaded with the special boot image.

2. The method according to claim 1, wherein the plurality of encrypted firmware updates comprise a plurality of encrypted firmware update images and said decrypted firmware updated comprises a decrypted firmware update image.

3. The method according to claim 1, further comprising:
authenticating, via the HCA, said particular encrypted firmware update of the said plurality of encrypted firmware updates.

4. The method according to claim 1, wherein:
the HCA connects to a service processor using a side-band path.

5. The method according to claim 1, wherein:
the HCA connects to a service processor using a side-band path; and
said receiving step comprises receiving said plurality of encrypted firmware updates from the network fabric at said HCA, using the side-band path via the service processor.

6. The method according to claim 5, further comprising:
preventing said host administrator from accessing the service processor.

7. The method according to claim 1, further comprising:
allowing said host administrator to store the selection of a particular encrypted firmware update of the said plurality of encrypted firmware updates in a persisted storage associated with the HCA.

8. The method according to claim 1, further comprising:
allowing said host administrator to control when the decrypted firmware update is installed by the HCA.

9. The method according to claim 1, further comprising:
storing initial authentication credentials in said HCA wherein said initial authentication credentials enable encrypted authentication without initial password or key distribution.

10. A system for supporting controlled and secure firmware update in a middleware machine environment the system comprising:
a fabric administrator system which manages a network fabric wherein the fabric administrator system provides a plurality of encrypted firmware updates on the network fabric;
a host node having a microprocessor and a memory;
a host channel adapter (HCA) in said host node wherein the host node uses the HCA to connect to a shared resource over said network fabric;
a normal boot image which provides access to a local file system of the host node but no access to firmware of the HCA of the host node, wherein when loaded with the normal boot image, the host node is accessible to a host administrator and not the fabric administrator system; and
a special boot image which provides access to firmware of the HCA of the host node but no access to the local file system of the host node, wherein when loaded with the special boot image, the host node is accessible to a fabric administrator system and not the host administrator;
wherein the host node is configured to receive said plurality of encrypted firmware updates from the network fabric via the HCA;
wherein the host node is configured, when loaded with the normal boot image, to communicate a selection of a particular encrypted firmware update of the said plurality of encrypted firmware updates from a host administrator of the host node to the HCA; and
wherein, when the host node is loaded with the special boot image, the HCA is configured to decrypt, in response to said selection, said particular encrypted firmware update of the said plurality of encrypted firmware updates in order to generate a decrypted firmware update and install said decrypted firmware update on said HCA.

11. The system according to claim 10, wherein the plurality of encrypted firmware updates comprise a plurality of encrypted firmware update images and said decrypted firmware updated comprises a decrypted firmware update image.

12. The system according to claim 10, wherein:
the HCA is configured to authenticate said particular encrypted firmware update of the said plurality of encrypted firmware updates.

13. The system according to claim 10, further comprising:
a service processor in said host node wherein the HCA connects to the service processor using a side-band path; and
wherein the host node is configured to receive said plurality of encrypted firmware updates from the network fabric using the side-band path via the service processor.

14. The system according to claim 10, further comprising:
a persistent storage associated with the HCA wherein the persistent storage is configured to allow said host administrator to store the selection of a particular encrypted firmware update of the said plurality of encrypted firmware updates.

15. The system according to claim 10, wherein:
said host administrator controls a time when the decrypted firmware update is installed by the HCA.

16. The system according to claim 10, further comprising:
initial authentication credentials stored in said HCA wherein said initial authentication credentials enable encrypted authentication without initial password or key distribution.

17. A non-transitory computer readable medium having instructions stored thereon for supporting controlled and secure firmware update of a host channel adapter (HCA) of a host node in a middleware machine environment, which instructions, when executed, cause a computer system to perform steps comprising:
managing the network fabric with a fabric administrator system;
providing the host node with a normal boot image which provides access to a local file system of the host node but no access to firmware of the HCA of the host node, wherein when loaded with the normal boot image, the host node is accessible to a host administrator and not the fabric administrator system;
providing the host node with a special boot image which provides access to firmware of the HCA of the host node but no access to the local file system of the host node, wherein when loaded with the special boot image, the host node is accessible to a fabric administrator system and not the host administrator;

using the fabric administrator system to provide a plurality of encrypted firmware updates on the network fabric;

receiving said plurality of encrypted firmware updates from the network fabric at said host node via the HCA;

communicating a selection of a particular encrypted firmware update of the said plurality of encrypted firmware updates from a host administrator of the host node to the HCA wherein said communicating is performed while the host node is loaded with the normal boot image;

decrypting in said HCA, in response to said selection, said particular encrypted firmware update of the said plurality of encrypted firmware updates in order to generate a decrypted firmware update;

operating said HCA to install said decrypted firmware update; and wherein said decrypting and operating said HCA to install said decrypted firmware is performed while the host node is loaded with the special boot image.

* * * * *